(12) United States Patent
Manes et al.

(10) Patent No.: US 12,180,033 B2
(45) Date of Patent: Dec. 31, 2024

(54) ELEVATOR SYSTEM WITH PLURAL WIRELESS COMMUNICATIONS PATHS

(71) Applicant: Otis Elevator Company, Farmington, CT (US)

(72) Inventors: Enrico Manes, Feeding Hills, MA (US); Goran Djuknic, New York, NY (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1418 days.

(21) Appl. No.: 16/713,845

(22) Filed: Dec. 13, 2019

(65) Prior Publication Data

US 2020/0189877 A1  Jun. 18, 2020

Related U.S. Application Data

(60) Provisional application No. 62/779,510, filed on Dec. 14, 2018.

(51) Int. Cl.
*B66B 1/34* (2006.01)
*H04W 24/08* (2009.01)

(52) U.S. Cl.
CPC .......... *B66B 1/3453* (2013.01); *B66B 1/3461* (2013.01); *H04W 24/08* (2013.01)

(58) Field of Classification Search
CPC ....... B66B 1/3453; B66B 1/3461; B66B 9/00; B66B 1/3423; B66B 1/3446; H04W 24/08
See application file for complete search history.

(56) References Cited

U.S. PATENT DOCUMENTS

| | | | |
|---|---|---|---|
| 5,387,769 A * | 2/1995 | Kupersmith | B66B 1/3415 370/461 |
| 7,104,363 B2 | 9/2006 | Mori et al. | |
| 7,896,137 B2 | 3/2011 | Ishikawa | |
| 8,132,026 B2 | 3/2012 | Koyama | |
| 8,344,688 B2 | 1/2013 | Yoda et al. | |
| 8,418,813 B2 | 4/2013 | Yim et al. | |
| 8,421,409 B2 | 4/2013 | Ichikawa | |
| 9,246,357 B2 | 1/2016 | Kamata | |
| 9,369,000 B2 | 6/2016 | Telefus | |
| 9,680,330 B2 | 6/2017 | Rudser | |
| 9,725,003 B2 | 8/2017 | Boyer et al. | |
| 9,837,860 B2 | 12/2017 | Mccarthy et al. | |

(Continued)

FOREIGN PATENT DOCUMENTS

| | | |
|---|---|---|
| CN | 101340106 B | 1/2009 |
| CN | 201238201 Y | 5/2009 |

(Continued)

OTHER PUBLICATIONS

European Search Report for Application No. 19216267.5; Issued May 12, 2020; 8 Pages.

*Primary Examiner* — Jeffrey Donels
(74) *Attorney, Agent, or Firm* — CANTOR COLBURN LLP

(57) ABSTRACT

An elevator system includes a controller; an elevator car; an elevator car controller mounted on the elevator car; a transceiver on the elevator car; an access point; the transceiver and the access point configured to provide wireless communications between the controller and the elevator car controller over a first communications path and a second communications path.

13 Claims, 4 Drawing Sheets

(56) References Cited

U.S. PATENT DOCUMENTS

| | | |
|---|---|---|
| 9,906,112 B2 | 2/2018 | Dwari et al. |
| 9,935,487 B2 | 4/2018 | Shibata et al. |
| 2012/0129458 A1* | 5/2012 | Yim .................. B66B 1/34 455/66.1 |
| 2016/0090275 A1 | 3/2016 | Piech et al. |
| 2016/0185568 A1* | 6/2016 | Kusserow ......... H04W 52/0203 340/3.31 |
| 2017/0057780 A1 | 3/2017 | Nguyen et al. |
| 2017/0057789 A1 | 3/2017 | Witczak et al. |
| 2017/0057791 A1 | 3/2017 | Hsu et al. |
| 2017/0057793 A1 | 3/2017 | Dwari et al. |
| 2018/0179021 A1 | 6/2018 | Uchida et al. |

FOREIGN PATENT DOCUMENTS

| | | | |
|---|---|---|---|
| CN | 203450984 U | 2/2014 | |
| CN | 104743416 A | 7/2015 | |
| CN | 104876076 A | 9/2015 | |
| CN | 106185500 A | 12/2016 | |
| CN | 206077058 U | 4/2017 | |
| CN | 107026510 A | 8/2017 | |
| CN | 107416631 A | 12/2017 | |
| CN | 108483147 A | 9/2018 | |
| DE | 102017109727 A1 * | 11/2018 | ........... B66B 1/2466 |
| EP | 2414269 B1 | 10/2013 | |
| JP | 2006137609 A | 6/2006 | |
| JP | 2013005489 A | 1/2013 | |
| JP | 5800638 B2 | 10/2015 | |
| WO | WO-2017152055 A1 * | 9/2017 | ........... B66B 1/3423 |

\* cited by examiner

ELEVATOR SYSTEM WITH PLURAL WIRELESS COMMUNICATIONS PATHS

CROSS-REFERENCE TO RELATED APPLICATIONS

This application claims the benefit of U.S. provisional patent application Ser. No. 62/779,510, filed Dec. 14, 2018, the entire contents of which are incorporated herein by reference.

BACKGROUND

The embodiments herein relate to elevator systems, and more particularly to an elevator system using a plurality of wireless communications paths between a controller and an elevator car controller of the elevator system.

In elevator systems, there is often a need to send and receive information between a controller and an elevator car controller. For example, the controller may receive speed information from the elevator car controller and then send a command to the elevator car controller to actuate a safety. In other examples, infotainment information is conveyed to the elevator car controller for presentation inside the elevator car. To eliminate the need for traveling cables, the communications between the controller and the elevator car controller may occur wirelessly.

SUMMARY

According to an embodiment, an elevator system includes a controller; an elevator car; an elevator car controller mounted on the elevator car; a transceiver on the elevator car; an access point; the transceiver and the access point configured to provide wireless communications between the controller and the elevator car controller over a first communications path and a second communications path.

In addition to one or more of the features described herein, or as an alternative, further embodiments of the system may include wherein at least one of the controller and the elevator car controller is configured to: detect a quality of the first communications path; compare the quality of the first communications path to a threshold; communicate primary information over the second communications path when the quality of the first communications path does not meet the threshold.

In addition to one or more of the features described herein, or as an alternative, further embodiments of the system may include wherein: at least one of the controller and the elevator car controller is configured to communicate secondary information over the first communications path when the quality of the first communications path does not meet the threshold.

In addition to one or more of the features described herein, or as an alternative, further embodiments of the system may include wherein: at least one of the controller and the elevator car controller is configured to communicate secondary information over the second communications path when the quality of the first communications path does not meet the threshold.

In addition to one or more of the features described herein, or as an alternative, further embodiments of the system may include wherein: the first communications path comprises a first channel of a network and the second communications path comprises a second channel of the network.

In addition to one or more of the features described herein, or as an alternative, further embodiments of the system may include wherein: the first communications path comprises a first frequency of a network and the second communications path comprises a second frequency of the network.

In addition to one or more of the features described herein, or as an alternative, further embodiments of the system may include wherein: the first communications path comprises a first network and the second communications path comprises a second network.

In addition to one or more of the features described herein, or as an alternative, further embodiments of the system may include wherein: the first network and the second network are the same type of network.

In addition to one or more of the features described herein, or as an alternative, further embodiments of the system may include wherein: the first network and the second network are different types of networks.

According to another embodiment, a method for providing communications between a controller and an elevator car controller in an elevator system, the method including providing wireless communications between the controller and the elevator car controller over a first communications path and a second communications path.

In addition to one or more of the features described herein, or as an alternative, further embodiments of the method may include detecting a quality of the first communications path; comparing the quality of the first communications path to a threshold; communicating primary information over the second communications path when the quality of the first communications path does not meet the threshold.

In addition to one or more of the features described herein, or as an alternative, further embodiments of the method may include communicating secondary information over the first communications path when the quality of the first communications path does not meet the threshold.

In addition to one or more of the features described herein, or as an alternative, further embodiments of the method may include communicating secondary information over the second communications path when the quality of the first communications path does not meet the threshold.

In addition to one or more of the features described herein, or as an alternative, further embodiments of the method may include wherein: the first communications path comprises a first channel of a network and the second communications path comprises a second channel of the network.

In addition to one or more of the features described herein, or as an alternative, further embodiments of the method may include wherein: the first communications path comprises a first frequency of a network and the second communications path comprises a second frequency of the network.

In addition to one or more of the features described herein, or as an alternative, further embodiments of the method may include wherein: the first communications path comprises a first network and the second communications path comprises a second network.

In addition to one or more of the features described herein, or as an alternative, further embodiments of the method may include wherein: the first network and the second network are the same type of network.

In addition to one or more of the features described herein, or as an alternative, further embodiments of the method may include wherein: the first network and the second network are different types of networks.

Technical effects of embodiments of the present disclosure include the ability to send and receive information between a controller and an elevator car controller using a plurality of wireless communications paths.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
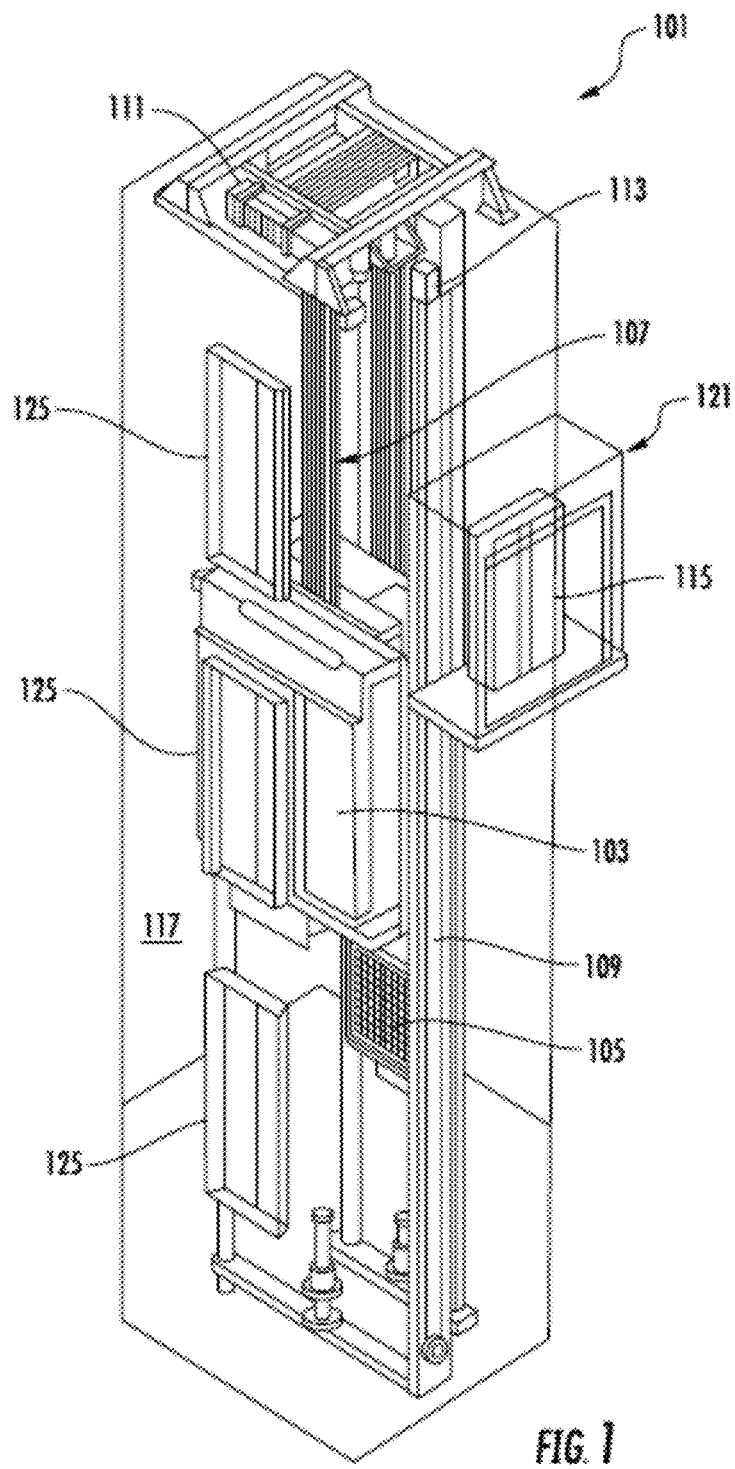
FIG. 1 depicts an elevator system in an example embodiment.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
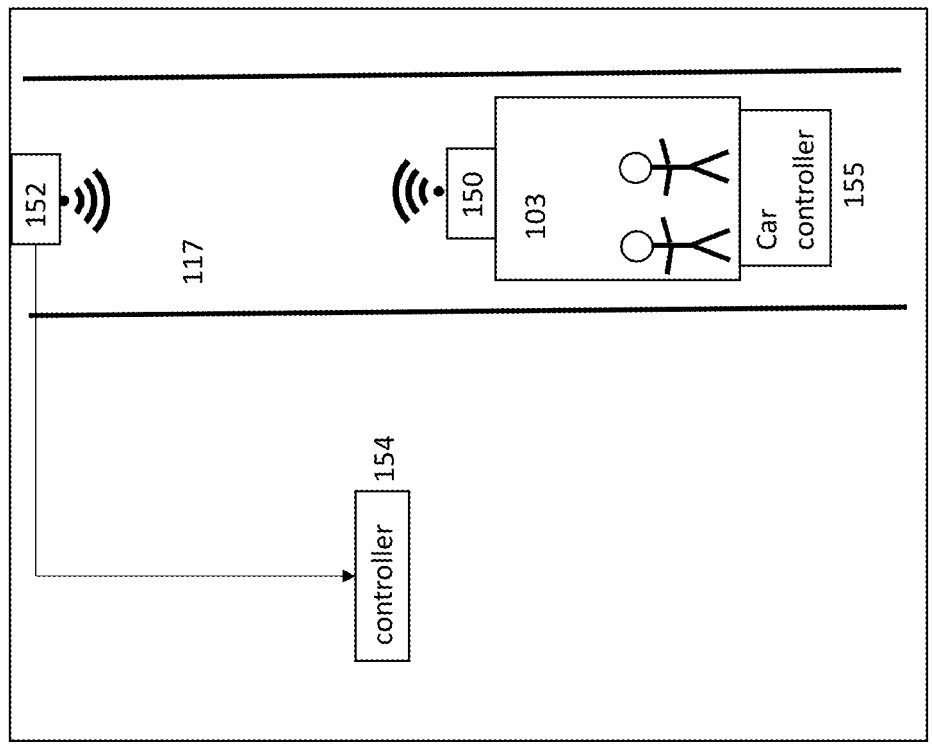
FIG. 2 depicts an elevator system with a plurality of wireless communications paths in an example embodiment.

FIG. 2 depicts an elevator system 101 with a plurality of wireless communications paths in an example embodiment. The elevator system 101 may include the elements of FIG. 1, many of which are not shown for clarity of illustration. The elevator system 101 includes a transceiver 150 positioned at the elevator car 103. The transceiver 150 is in bi-directional, wireless communication with an access point 152. The access point 152 is in communication with a controller 154 using known communication techniques (e.g., wired and/or wireless networking). The access point 152 may be located in the hoistway 117, outside the hoistway 117 or be embedded as part of the controller 154. The controller 154 may be the same controller 115 that controls movement of the elevator car 103 or a different controller in communication with controller 115. The controller 154 may be implemented using a processor-based device (e.g., computer, server, distributed computing network, etc.) having known elements (processor, memory, communication device, etc.).

An elevator car controller 155 travels with elevator car 103. The elevator car controller 155 may be implemented using a processor-based device having known elements (processor, memory, communication device, etc.). The elevator car controller 155 monitors elevator car information such as door status, current speed, elevator car location, state of safeties, car load, car occupancy, car controller status, car fan status, car light status, car operating panel status, etc. The elevator car controller 155 also controls operation of components of the elevator car 103 such as lighting level, fan speed, door open/close, information display in car, car operating panel lighting, safety actuation/deactivation, etc.

In operation, the controller 154 communicates primary information to/from the elevator car controller 155. The primary information may include commands from the controller 154 to the elevator car controller 155 that effect high priority aspects of the elevator car 103, such as opening an elevator car door, activating a safety, emergency lighting, emergency announcements, etc. The primary information may include the elevator car information from the elevator car controller 155 to the controller 154, such as door status, current speed, elevator car location, state of safeties, car load, elevator car controller status, elevator car fan status, elevator car light status, elevator car operating panel status, etc.

The controller 154 also communicates secondary information to/from the elevator car controller 155. The secondary information may include commands from the controller 154 to the elevator car controller 155 that affect low priority aspects of the elevator car 103. The secondary information may include entertainment information (e.g., local weather, local news), audio (e.g., elevator music), video, non-emergency lighting settings, etc.

Figure 3:
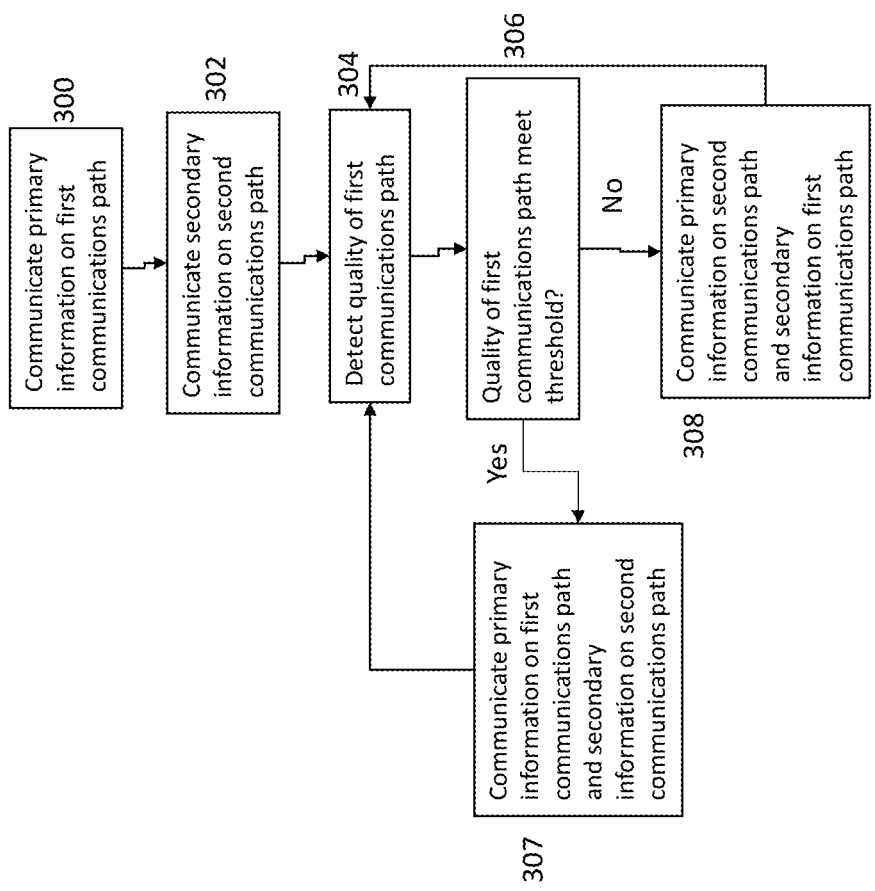
FIG. 3 depicts a process for providing communications between a controller and an elevator car controller in an example embodiment.

FIG. 3 depicts a process for providing communications between the controller 154 and the elevator car controller 155 in an example embodiment. The process begins at 300 where the primary information is communicated between the controller 154 and the elevator car controller 155 over a first communications path. At 302, the secondary information is communicated between the controller 154 and the elevator car controller 155 over a second communications path. At 304, at least one of the controller 154 and the elevator car controller 155 detects the quality of the first communications path. The quality of the first communications path may be measured using known measures such as signal-to-noise ratio, bit error rate, etc. At 306, at least one of the controller 154 and the elevator car controller 155 compares the quality of the first communications path to a threshold (e.g., a defined signal to noise ratio (SNR), received signal strength (RSSI), bit error rate (BER), packet error rate (PER), etc.). If the quality of the first communications path meets the threshold, the process flows to 307 where the primary information is kept on the first communications path, the secondary information is kept on the second communications path and the process returns to 304.

If the quality of the first communications path does not meet the threshold, the process flows to 308 where the primary information is communicated between the controller 154 and the elevator car controller 155 over the second communications path. Step 308 may also include communicating the secondary information between the controller 154 and the elevator car controller 155 over the first communications path. The process returns to 304 to continue monitoring the quality of the first communications path. If the quality of the first communications path improves to meet the threshold, then the primary information may be moved back to the first communications path and the secondary information moved back to the second communications path as shown at 307.

FIG. 3 is just one example of how communications can be adjusted in response to quality of a communications path. In the embodiment of FIG. 3, the primary information and secondary information switch communications paths in response to quality of the primary communications path. In other embodiments, the secondary information may be communicated on the first communications path, along with the primary information, if the quality of the second communications path does not meet a threshold. In other embodiments, the primary information and the secondary information are initially communicated on the first communications path together, and the primary information (either alone or with the secondary information) is moved to the second communications path when the quality of the first communications path does not meet the threshold.

In one embodiment, the first communication path and the second communication path are implemented using a first channel and second channel of a single communications network. For example, the transceiver 150 and the access point 152 may communicate using IEEE 802.11xx protocols. In this example, the primary communications path may be a first channel (e.g., centered at 2412 MHz) and the secondary communications path may be a second channel (e.g., centered at 2432 MHz). This is an example of using two channels of the same network. The transceiver 150 and the access point 152 may also search for channels having good quality, rather than default to fixed channels.

In another embodiment, the first communication path and the second communication path are implemented using different frequencies of single communications network. For example, the transceiver 150 and the access point 152 may communicate using IEEE 802.11n protocols. In this example, the primary communications path may be a first frequency (e.g., 2.4 GHz) and the secondary communications path may be a second frequency (e.g., 5 GHz). This is an example of using two frequencies of the same network.

Figure 4:
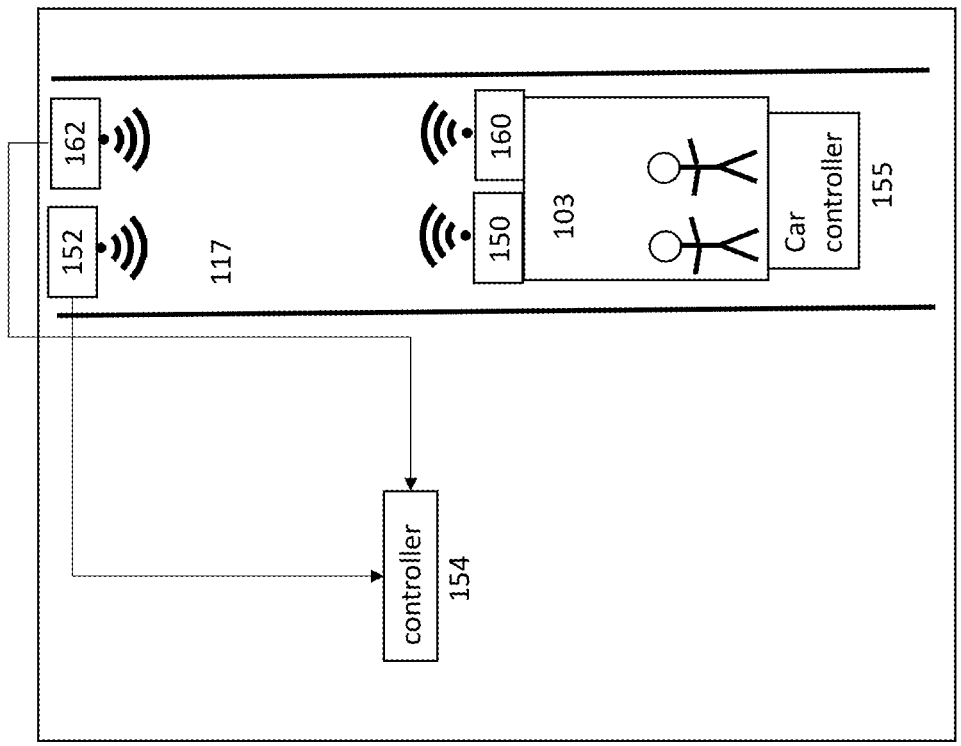
FIG. 4 depicts an elevator system with a plurality of wireless communications paths in an example embodiment.

FIG. 4 depicts an elevator system 101 with a plurality of wireless communications paths in another example embodiment. In the example of FIG. 4, the elevator car 103 includes a first transceiver 150 in communication with a first access point 152, similar to that shown in FIG. 2. The elevator car 103 also includes a second transceiver 160 in communication with a second access point 162. The first transceiver 150 and the first access point 152 may define the first communications path. The second transceiver 160 and the second access point 162 may define the second communications path. The embodiment of FIG. 4 allows the use of separate networks. For example, the first transceiver 150 and the first access point 152 may define a first network under the IEEE 802.11xx protocol and the second transceiver 160 and the second access point 162 may define a second network under the IEEE 802.11xx protocol. In other embodiments, the first network and the second network are not the same type. Rather than the first network and the second network both being implemented under the IEEE 802.11xx protocol, the first network may be implemented under the IEEE 802.11xx protocol and the second network may be of a different type (e.g., cellular, GSM, 5g, Zigbee, free-space optical communications link, etc.). Thus, the first network and the second network may be of different types. Regardless of the network configurations, the process of FIG. 3 is used to switch communications from the first communications path to the second communications path when the quality of the first communications path does not meet the threshold.

In yet another embodiment, the first communications path and the second communications path are used at the same time for both the primary information and the secondary information. In this embodiment, both the first communications path and the second communications path are transmitting the primary information and the secondary information. A comparison may be performed across the first communications path and the second communications path for safety/security. In one example, maximal ratio combining (MRC) is used, where two signals carrying the same message (but independent enough due to transmission via different paths or on different frequencies) are combined to achieve better signal-to-noise ratio and therefore lower BER. Before summing, the signals can be weighted according to credibility (i.e., the signal that came over the path with a better SNR would be weighted more in the summation). In other embodiments, sidebands are used to communicate the primary information and/or the secondary information for error checking and signal integrity verification.

Embodiments described herein reference a first communications path and a second communications path, but embodiments may be expanded to more than two communications paths. The primary information may be moved to a second communications path, third communications path, etc., as needed.

Embodiments of the disclosure provide the benefit of an additional communications path so that the redundancy is built into the system design, such that the second communications path is commandeered in situations where the primary communications path is compromised.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
   a controller;
   an elevator car;
   an elevator car controller mounted on the elevator car;
   a transceiver on the elevator car;
   an access point;
   the transceiver and the access point configured to provide wireless communications between the controller and the elevator car controller over a first communications path and a second communications path;
   wherein at least one of the controller and the elevator car controller is configured to:
   detect a quality of the first communications path;
   compare the quality of the first communications path to a threshold;
   communicate primary information over the first communications path when the quality of the first communications path meets the threshold;
   communicate secondary information over the second communications path when the quality of the first communications path meets the threshold;
   switch communication of the primary information from the first communications path to the second communications path when the quality of the first communications path does not meet the threshold; and
   switch communication of the secondary information from the second communications path to the first communications path when the quality of the first communications path does not meet the threshold.

2. The elevator system of claim 1 wherein:
   the first communications path comprises a first channel of a network and the second communications path comprises a second channel of the network.

3. The elevator system of claim 1 wherein:
   the first communications path comprises a first frequency of a network and the second communications path comprises a second frequency of the network.

4. The elevator system of claim 1 wherein:
   the first communications path comprises a first network and the second communications path comprises a second network.

5. The elevator system of claim 4 wherein:
   the first network and the second network are the same type of network.

6. The elevator system of claim 4 wherein:
   the first network and the second network are different types of networks.

7. The elevator system of claim 1 wherein the primary information and the secondary information are different.

8. A method for providing communications between a controller and an elevator car controller in an elevator system, the method comprising:
   providing wireless communications between the controller and the elevator car controller over a first communications path and a second communications path;
   detecting a quality of the first communications path;
   comparing the quality of the first communications path to a threshold;
   communicating primary information over the first communications path when the quality of the first communications path meets the threshold;
   communicating secondary information over the second communications path when the quality of the first communications path meets the threshold;
   switching communication of the primary information from the first communications path to the second communications path when the quality of the first communications path does not meet the threshold; and
   switching communication of the secondary information from the second communications path to the first communications path when the quality of the first communications path does not meet the threshold.

9. The method of claim 8 wherein:
   the first communications path comprises a first channel of a network and the second communications path comprises a second channel of the network.

10. The method of claim 8 wherein:
    the first communications path comprises a first frequency of a network and the second communications path comprises a second frequency of the network.

11. The method of claim 8 wherein:
    the first communications path comprises a first network and the second communications path comprises a second network.

12. The method of claim 11 wherein:
    the first network and the second network are the same type of network.

13. The method of claim 11 wherein:
the first network and the second network are different types of networks.

\* \* \* \* \*